United States Patent Office 2,768,626
Patented Oct. 30, 1956

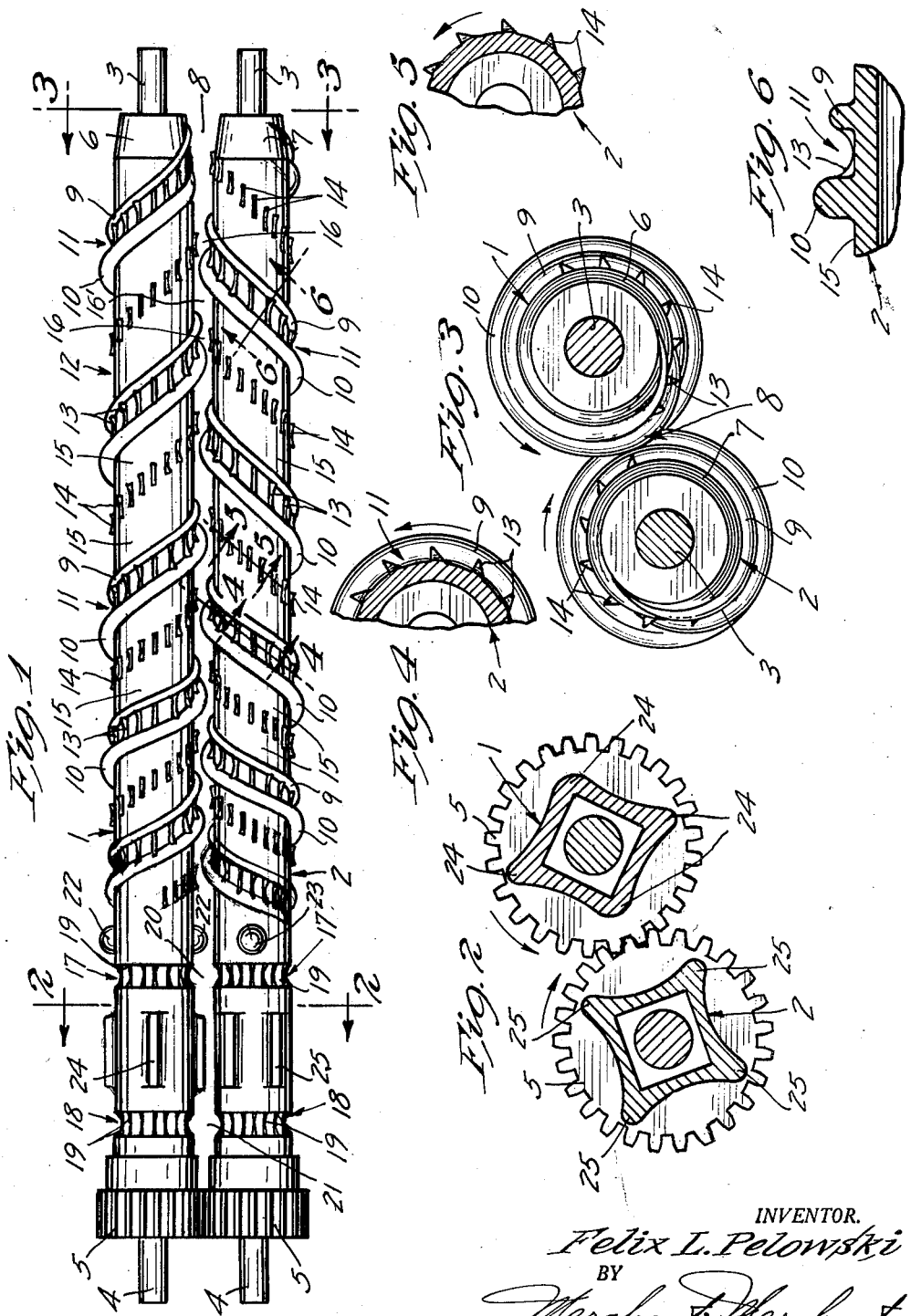

2,768,626

SNAPPING ROLLS FOR CORN PICKERS

Felix L. Pelowski, St. Charles, Minn.

Application November 23, 1955, Serial No. 548,701

5 Claims. (Cl. 130—5)

My invention relates to snapping rolls utilized in corn picking mechanisms for the purpose of removing ears of corn from the stalks as the mechanism is moved through a field.

It is well known among those familiar with corn harvesting machinery, that the snapping rolls of corn picker mechanisms frequently become jammed or choked with cornstalks and like trash to the extent that operation thereof ceases, and the accumulated trash must be removed before the harvesting operation can be resumed. Inasmuch as difficulty is experienced in removal of the trash when the snapping rolls are stationary, operators frequently endeavor to free the rolls while the same are being power driven, and many injuries have resulted from this practice. The primary object of my invention, is therefore, the provision of a pair of cooperating snapping rolls which remove ears of corn from the stalks and thereafter discharge the stalks and leaves in a rapid and efficient manner so as to eliminate clogging or choking of the rolls.

Another important object of my invention is the provision of snapping rolls which will effectively remove the ears from the stalks without damage to the ears and with a minimum of shelling kernels of corn from the ears.

Another object of my invention is the provision of snapping rolls having means which, when a stalk breaks thereabove, will raise the broken-off portion to an upright position and feed the same downwardly between the rolls without the same becoming jammed therebetween.

The above and still further highly important objects and advantages of my invention will become apparent from the following detailed specification, appended claims, and attached drawings.

Referring to the drawings, which illustrate the invention, and in which like characters indicate like parts throughout the several views:

Fig. 1 is a view in plan of a pair of snapping rolls made in accordance with my invention;

Fig. 2 is an enlarged transverse section taken substantially on the line 2—2 of Fig. 1;

Fig. 3 is an enlarged transverse section taken on the line 3—3 of Fig. 1;

Fig. 4 is an enlarged fragmentary section taken substantially on the line 4—4 of Fig. 1;

Fig. 5 is an enlarged transverse section taken substantially on the line 5—5 of Fig. 1; and Fig. 6 is an enlarged fragmentary detail in section taken substantially on the line 6—6 of Fig. 1.

In the preferred embodiment of my invention illustrated, a pair of snapping rollers 1 and 2 are shown as being disposed in closely spaced side by side parallel relation as they would be mounted in a conventional power driven corn picking machine, not shown. The rolls 1 and 2 have aligned stub shafts 3 and 4 at their front and rear ends respectively, and each are provided with intermeshing drive gears 5 whereby the same are adapted to be rotated in directions to feed material downwardly therebetween. With reference to Figs. 2 and 3, it will be seen that the roller 1 is preferably mounted at a slightly higher elevation than the roll 2 in accordance with present-day practice of several manufacturers of corn picking machinery. It will be further assumed that the cylindrical rolls 1 and 2 are disposed in the machine at a rearward inclination, so that, as the machine moves through a field, and a cornstalk is engaged by the rolls 1 and 2, the engaged portion of the stalk will become progressively elevated as the rolls 1 and 2 move forwardly with respect to the stalk.

The front ends of the rolls 1 and 2 are formed to provide frusto-conical portions 6 and 7 respectively which cooperate to define a rearwardly tapering passage 8 for cornstalks entering the space between the rolls 1 and 2. The rolls 1 and 2 are each provided with a pair of flanges 9 and 10 which project radially outwardly therefrom and which extend helically from their respective end portions 6 and 7 toward the opposite ends of the rolls for the greater part of the length thereof, terminating in axially spaced relation to their respective gears 5. With respect to Figs. 1 and 6 it will be seen that the forward flange 9 of each roll 1 and 2 is of relatively short radial height and axial width, whereas the rear flange 10 of each roll is of greater radial height and axial width than its cooperating flange 9. With reference to Fig. 1 it will also be seen that the flanges 9 and 10 of each roll define relatively narrow helically extending channels 11 and relatively wide helically extending channels 12. Preferably the relatively narrow channels 11 are of a uniform width throughout their entire length, whereas the relatively wide channels 12 decrease in width from the front end portions of the rolls 1 and 2 toward the rear ends thereof. In other words, the helical pitch of the relatively wide channels 12 decreases from the front ends of the rolls toward the rear ends thereof. It will be further noted with reference to Fig. 1, that the helical direction of the flanges 9 and 10 of the snapping roll 1 is opposite that of the snapping roll 2 for a purpose which will hereinafter become apparent.

For the purpose of imparting relative downward feeding movement to cornstalks engaged by the snapping rolls, I provide helically extending rows of, circumferentially spaced, radially outwardly projecting gripping and feeding teeth 13 which extend axially from the feed flanges 9 to the rearward flanges 10. With reference to Fig. 6, it will be seen that the teeth 13 increase in height from the axially central portions thereof to the flanges 9 and 10, and that the maximum height of the teeth 13 is less than the radial height of the relatively small flange 9. Preferably, the teeth 13 at their axially central portions are substantially tangential to the cylindrical surface of the rolls 1 and 2. I further provide helically extended rows of circumferentially spaced teeth 14 which project radially outwardly from the cylindrical surfaces of the rolls 1 and 2 in the axially intermediate portions of the relatively wide channels 12. The teeth 14 are preferably identical to the teeth 13 and terminate at their opposite ends in spaced relation to the adjacent flanges 9 and 10 whereby to provide helically extending relatively smooth cylindrical surfaces 15 there-between and said flanges, the axial width of the cylindrical surfaces 15 decreasing from the front ends of the rolls 1 and 2 toward the rear ends thereof.

The staggered relationship between the flanges 9 and 10 of the snapping roller 1 with respect to those of the roller 2 is such that the feeding teeth 13 of one of the snapping rollers cooperate with the teeth 14 of the other thereof to define cornstalk receiving apertures 16, which apertures travel rearwardly with respect to the rollers 1 and 2 during rotation thereof. The relatively small flanges 9 permit entry of the stalks into the apertures 16 during forward movement of the machine and the relatively large rearward flanges 10 operate to retain the stalks within the openings 16 wherein the feeding teeth 13 and 14 bite into opposite side portions of the stalk to feed the same in a relatively downward direction between the rolls 1 and 2. Thus, as each stalk enters the tapering mouth 8, it is engaged by the feeding teeth almost immediately and feeding movement is imparted to the stalk without appreciable delay. As the rolls 1 and 2 approach an ear of corn on the stalk, the combined thickness of the stalk and ear being substantially greater than the size of the openings 16, the ear will be snapped away from the stalk and carried away in the usual manner, the stalk continuing relatively downwardly between the rolls 1 and 2. In the event that the separated ear of corn is not immediately thrown clear of the rolls 1 and 2, and falls upon the rolls, the relatively large helical flanges 10 aid in supporting the ear radially outwardly of the teeth 13 and 14 so that shelling of the ear, in most cases, is prevented altogether, or at least held to a bare minimum.

It will be noted that the cylindrical surface portions 15 of each roll cooperate with adjacent cylindrical portions of the other thereof to provide relatively large openings 16' between the rolls 1 and 2 for the reception and feeding therebetween of relatively large diameter stalks. Thus, the stalks that are unable to initially enter the openings 16 remain in the larger openings 16' and are fed downwardly therethrough by frictional engagement therewith of the cylindrical surface portions 15.

At their rear end portions the snapping rolls 1 and 2 are each provided with a pair of axially spaced circumferentially extended grooves 17 and 18, each having circumferentially spaced feeding teeth 19 therein, similar to the feeding teeth 13 and 14. The channels 17 define a feeding aperture 20 whereas the channels 18 define a similar feeding aperture 21 axially rearwardly of the feeding aperture 20 and forwardly of the gears 5. The snapping roll 1 is provided with diametrically opposed pairs of hemispherical elements 22 projecting radially outwardly of the cylindrical surface thereof in closely spaced axially forward relation to the groove 17 thereof. Likewise, the snapping roller 2 is provided with a pair of diametrically opposed hemispherical elements 23, one of which is shown, projecting radially outwardly from the cylindrical surface of the roll 2 and spaced axially forwardly of the groove 17 thereof in the same manner as the elements 22 of the roll 1. It will be noted with reference to Fig. 1 that the hemispherical elements 23 are circumferentially offset substantially 90 circular degrees with respect to the hemispherical elements 22 of the roll 1. Preferably, the elements 22 and 23 are in the nature of metallic balls which are seated in their respective rolls 1 and 2 and are rotatable about their own centers, although this rotation is not absolutely essential to the efficient operation thereof. In the event that a stalk should be broken above the rolls 1 and 2 during the feeding and snapping operation, subsequent rearward and upward movement of the broken-off portion of the stalk on the rolls 1 and 2 will cause the rear end thereof to be engaged by one of the hemispherical elements 22 or 23 which tend to pull the adjacent end of the stalk downwardly between the rolls 1 and 2 and raise the stalk to a substantially upright position, wherein the stalk will be received in the opening 20 defined by the channels 17 and feed downwardly therethrough to be deposited on the ground therebelow.

For the purpose of further aiding in the clearing of stalks and trash which may not be normally fed through the rolls or which may escape being fed by the toothed grooves 17, due to a more thick and heavy growth than is normal, I provide means associated with the circumferential grooves 18 to cause the material to be rapidly and efficiently cleared. Such means includes a plurality of axially elongated radially outwardly projecting lugs 24 and 25 on the rolls 1 and 2 respectively between the grooves 17 and 18 thereof. With reference to Fig. 2 it will be seen that the lugs 24 of the roll 1 are circumferentially staggered with respect to the lugs 25 of the roll 2 so that sufficient space is maintained therebetween through which material may be fed downwardly thereby. With the arrangement above described, I have been able to harvest an entire field of corn under abnormal conditions without the necessity of stopping the machine to clear the rolls.

While I have shown and described a commercial embodiment of my novel snapping rolls, it will be understood that the same are capable of modification without departure from the spirit and scope of the invention as defined in the claims.

What I claim is:

1. Snapping rolls comprising a pair of elongated cylindrical members disposed in side by side parallel relationship, means for imparting common rotation to said members in directions to feed material tangentially therebetween, each of said rollers having a pair of cooperating radially outwardly projecting flanges extending helically thereof to provide relatively wide and relatively narrow helical channels extending from the forward end portion of said members for the greater part of the length thereof, and a helically extended row of circumferentially spaced axially extended feeding teeth in each of said channels, the teeth in said relatively narrow channels extending to both flanges thereof, the teeth in said relatively wide channels being spaced from the adjacent channel forming flanges to provide helically extending relatively smooth cylindrical surfaces between the ends of said last-mentioned teeth and said flanges, the teeth in the relatively narrow channel of one of said members cooperating with the teeth in the relatively wide channel of the other thereof to feed said material.

2. The structure defined in claim 1 in which said teeth project radially outwardly from said cylindrical members a greater distance at their ends than at their intermediate portions whereby to define arcuate gripping edges.

3. The structure defined in claim 1 in which the teeth in said relatively wide channels are of uniform length axially of said members and in which said relatively wide channels are progressively narrower from the front ends of said cylindrical members toward the rear end.

4. The structure defined in claim 1 in which the forward flange of each pair thereof is radially shorter and axially narrower than the rearward flange of each pair thereof, the maximum height of said teeth being less than that of said forward flange.

5. The structure defined in claim 1 in which said cylindrical members are provided with opposed circumferentially extended grooves intermediate the rear ends thereof and the adjacent ends of said channels, said grooves having spaced feeding teeth therein and defining an enlarged opening for the reception of stalks therein, and in further combination with diametrically opposed hemispherical elements on said cylindrical members between the rear ends of said helical flanges and said grooves, the hemispherical elements of one of said cylindrical members being circumferentially staggered with respect to those of the other cylindrical member.

References Cited in the file of this patent
UNITED STATES PATENTS
112,735    Philip _____ Mar. 14, 1871